US008612980B2

(12) United States Patent
Martin et al.

(10) Patent No.: US 8,612,980 B2
(45) Date of Patent: *Dec. 17, 2013

(54) DISTRIBUTION OF JOB IN A PORTABLE FORMAT IN DISTRIBUTED COMPUTING ENVIRONMENTS

(75) Inventors: Jocelyn Luke Martin, Burwell (GB); Loren Dean, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1524 days.

This patent is subject to a terminal disclaimer.

(21) Appl. No.: 11/060,971

(22) Filed: Feb. 17, 2005

(65) Prior Publication Data

US 2006/0107266 A1  May 18, 2006

Related U.S. Application Data

(63) Continuation-in-part of application No. 10/940,151, filed on Sep. 13, 2004, now Pat. No. 7,502,745, which is a continuation-in-part of application No. 10/729,752, filed on Dec. 4, 2003, and a continuation-in-part of application No. 10/896,671, filed on Jul. 21, 2004, and a continuation-in-part of application No. 10/896,784, filed on Jul. 21, 2004.

(51) Int. Cl.
*G06F 9/46* (2006.01)

(52) U.S. Cl.
USPC .......................................................... 718/102

(58) Field of Classification Search
USPC .......................................................... 718/102
See application file for complete search history.

(56) References Cited

U.S. PATENT DOCUMENTS

| 5,930,465 | A | * | 7/1999 | Bellucco et al. | 358/1.15 |
| 6,173,322 | B1 | * | 1/2001 | Hu | 709/224 |
| 7,376,693 | B2 | * | 5/2008 | Neiman et al. | 709/201 |
| 7,395,536 | B2 | * | 7/2008 | Verbeke et al. | 718/100 |
| 7,886,296 | B2 | * | 2/2011 | Ly et al. | 718/100 |
| 2002/0161890 | A1 | | 10/2002 | Chen | |

(Continued)

FOREIGN PATENT DOCUMENTS

EP  1283466 A1  2/2003

OTHER PUBLICATIONS

Czajkowski, Karl et al., "A Resource Management Architecture for Metacomputing Systems," *Lecture Notes on Computer Science*, pp. 62-82 (1998).

(Continued)

*Primary Examiner* — Gregory A Kessler
(74) *Attorney, Agent, or Firm* — Harrity & Harrity, LLP

(57) ABSTRACT

A method, system and computer program product is disclosed for providing a distributed computing environment in which an arbitrary job manager or scheduler is able to be employed. In the distributed computing environment, a job is created in a host or client to include one or more technical computing tasks and submitted to the arbitrary scheduler in a portable format. Since the portable format of the job is independent of the platform structure of the scheduler, the schedule can handle the job regardless of the platform structure of the scheduler. The scheduler then transfers the job in the portable format to one or more remote workers. The present invention utilizes a portable format to submit the job to a scheduler and to distribute the job to remote workers so that any scheduler can receive and distribute the job to the remote workers.

36 Claims, 7 Drawing Sheets

(56) References Cited

U.S. PATENT DOCUMENTS

| | | | |
|---|---|---|---|
| 2002/0186384 A1 | 12/2002 | Winston et al. | |
| 2003/0125816 A1* | 7/2003 | Leduc et al. | 700/17 |
| 2005/0021594 A1 | 1/2005 | Bernardin et al. | |
| 2005/0034130 A1* | 2/2005 | Skovira | 718/105 |
| 2005/0283534 A1* | 12/2005 | Bigagli et al. | 709/229 |
| 2006/0048157 A1 | 3/2006 | Dawson et al. | |

OTHER PUBLICATIONS

European Office Action for Application No. 06734338.4, dated Mar. 20, 2009.

Husbands, Parry Jones Reginald, "Interactive Supercomputing," pp. 1-96 (1999).

Linda User's Guide and Reference Manual; May 2000; 163 pgs.; Scientific Computing Associates, New Haven CT; US.

Kim, Young-Seok et al, "Design and Implementation of OGSI-Compliant Grid Broker Service," *IEEE International Symposium on Cluster Computing and the Grid*, pp. 754-761 (2004).

MacLaren, Jon, "Advance Reservations: State of the Art," retrieved online from: http://www.fz-juelich.de/zam/RD/coop/ggf/graap/sota-06.06.03/sched-graap-2.0.pdf (2006).

Petcu, Dana et al, "Extending Maple to the Grid: Design and Implementation," Parallel and Distributed Computing, 2004. Third International Symposium on/Algorithms, Models and Tools for Parallel Computing on Heterogeneous Networks, pp. 209-216 (2004).

Pound, G.E. et al, "A Grid-Enabled Problem Solving Environment (PSE) for Design Optimisation within Matlab," *Parallel and Distributed Processing Symposium*, pp. 50-57 (2003).

Xue, Gang et al, "Implementation of a Grid Computation Toolkit for Design Optimisation with Matlab and Condor," *EURO-PAR 2003 Parallel Processing Lecture Notes in Computer Science*, pp. 357-365 (2004).

International Search Report for Application No. PCT/US2006/003923, dated Jul. 13, 2006.

Japanese Office Action for Application No. 2007-556166, drafted Mar. 17, 2011.

European Summons to Attend Oral Proceedings Pursuant to RUle 115(1) EPC for Application No. 06734338.4, dated Nov. 23, 2011.

Japanese Office Action for Application No. 2007-556166, 5 pages, dated Jun. 12, 2012.

Konishi, Katsumi et al., "Performance Evaluation of Parallel Computing Tool for MATLAB on PC Grid Environment," Information Processing Society of Japan, Technical Report, vol. 2005(14):31-36 (2005).

Osumi, Tomotaka et al., "Performance Evaluation of Load Balancing Algorithms for the Grid Application Parallelized with Hierarchical Master-Worker Paradigm," Information Processing Society of Japan, SIG Technical Reports, vol. 2004(81):31-36 (2004).

Japanese Questioning for Application No. 2012-20049, 8 pages, dated Mar. 26, 2013.

* cited by examiner

DISTRIBUTION OF JOB IN A PORTABLE FORMAT IN DISTRIBUTED COMPUTING ENVIRONMENTS

RELATED APPLICATION

This application is a continuation-in-part of U.S. application Ser. No. 10/940,151 U.S. Pat. No. 7,502,745B1 filed on Sep. 13, 2004, which is a continuation-in-part of pending U.S. application Ser. Nos. 10/729,752 filed Dec. 4, 2003, 10/896,671 filed Jul. 21, 2004 and 10/896,784 filed Jul. 21, 2004.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to distributed computing environments and more particularly to systems, methods and computer program products for distributing a job in a portable format in the distributed computing environments.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar worker environment. However, a single worker can be limiting to the size of the problem that can be solved, because of the relationship of the computing power of the worker to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single computer would take an unreasonable or undesirable amount of time to perform these simulations. In this case, the single computer would be allocated full-time to performing the computation while many computer resources on the network may be idle. Additionally, the benefit of the interactive features of the software is reduced as the computation time increases.

With many engineering and scientific problems requiring larger and more complex modeling, computations accordingly become more resource intensive and time-consuming. When a computation becomes so large and complex that it cannot be completed in a reasonable amount of time on a single computer, a solution to decrease the computation time is needed. As a solution, distributed computing systems have been provided to deal with a large and complex engineering and scientific computation. In the distributed computing systems, a job manager or scheduler may be employed to distribute a given computation to remote computing entities so that the remote computing entities are able to perform the distributed computation. The job manager or scheduler may be provided by various vendors, and may be unique in many respects. Therefore, it is needed for the distributed computing environment to interface with an arbitrary job manager provided by an arbitrary vendor (i.e., any one of a number of different job managers). In the conventional distributed computing environment, however, the job manager or scheduler deals with tasks in a job to distribute the tasks to remote computing entities, which increases the dependency of the distributed computing environment upon the platform structure of the job manager or scheduler. Therefore, it is needed to provide a distributed computing environment that is independent of the platform structure of the job manager or scheduler.

SUMMARY OF THE INVENTION

The present invention provides a distributed computing environment in which an arbitrary job manager or scheduler is able to be employed. In the distributed computing environment of the present invention, a job is created in a host or client to include one or more tasks and submitted to the arbitrary scheduler in a portable format. Since the portable format of the job or tasks is independent of the platform structure of the scheduler, the schedule can handle the job or tasks regardless of the platform structure of the scheduler. The scheduler then transfers the job or tasks in the portable format to one or more remote workers. The scheduler may receive the results of executing the tasks from the remote workers and return them to the host or client. The present invention utilizes a portable format to submit the job to a scheduler and to distribute the job to remote workers so that any scheduler can receive and distribute the job to the remote workers.

The present invention also provides an interface between the host or client and the arbitrary scheduler so that the host or client is able to submit information on the job to the arbitrary scheduler. The information on the job is used for the scheduler to distribute the job to one or more remote workers. Interfaces with the arbitrary scheduler may also be provided to establish communication channels between the arbitrary scheduler and the remote workers so that the arbitrary scheduler is able to distribute the job to the remote workers through the communication channels. The scheduler may send the remote workers information on the designation of one or more tasks that are to be executed in each remote worker. The remote workers may execute the designated one or more tasks and return the results of executing the one or more tasks to the arbitrary scheduler, which, in turn, forwards the results to the host or client.

In one aspect of the present invention, a method and a computer program product are provided in a client for creating and submitting a job to a scheduler. The method includes the steps of creating a job including one or more computing tasks, and saving the job in a portable format. The method also includes the steps of establishing a communication channel with a scheduler; and submitting to the scheduler the job in the portable format through the communication channel. The method may include the step of receiving results of the job from the scheduler through the communication channel.

In another aspect of the present invention, a method and a computer program product are provided in a worker for receiving and executing a job. The method includes the steps of establishing a communication channel with a scheduler, and receiving a job in a portable format from the scheduler through the communication channel. The method also includes the steps of receiving information on the designation of one ore more computing tasks in the job, and executing the one or more tasks based on the information on the designation of the one or more tasks received from the scheduler.

In another aspect of the present invention, a system includes a client for creating a job that has one or more computing tasks. The system also includes a storage for saving the job in a portable format. The system further includes an interface for establishing a communication channel between the client and a scheduler so that the client submits the job in a portable format to the scheduler through the communication channel.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
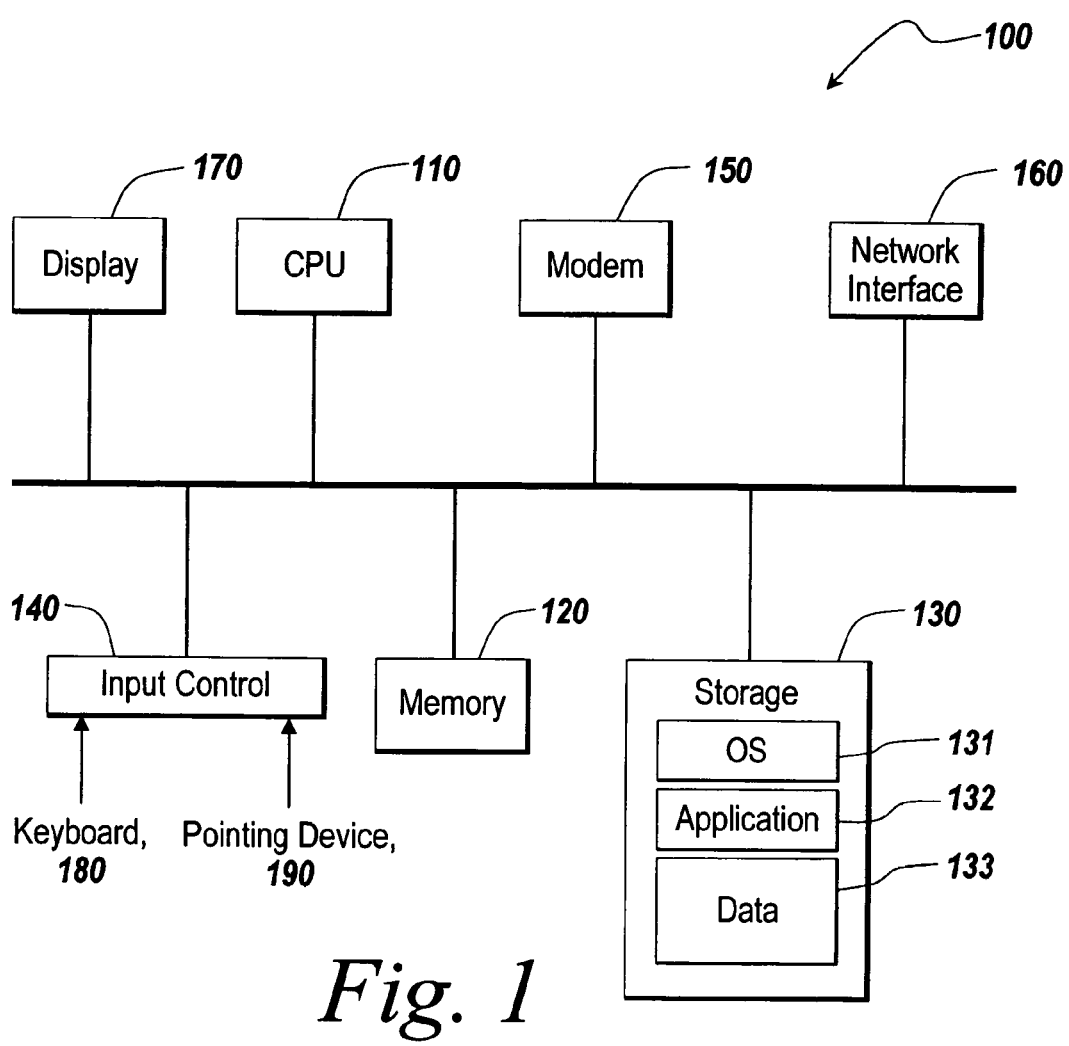
FIG. 1 is a block diagram showing an exemplary computing device for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a distributed computing environment in which an arbitrary scheduler is able to be employed. In the distributed computing environment of the illustrative embodiment, tasks can be created on a technical computing client and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

The illustrative embodiment will be described solely for illustrative purposes relative to a distributed MATLAB® technical computing environment. Although the illustrative embodiment will be described relative to a distributed MATLAB®-based application, one of ordinary skill in the art will appreciate that the present invention may be applied to distributing the processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

In the illustrative embodiment of the present invention, a job including technical computing tasks may be submitted to an arbitrary scheduler for distributing the job to remote technical computing workers for execution of the tasks on multiple computers systems. The job is submitted to the arbitrary scheduler in a portable format, such as a MAT-file format. In the illustrative embodiment, the portable format refers to the format of a program or database that is capable of being moved to various systems. The illustrative embodiment utilizes the MAT-file format to submit the job to a scheduler. Since the MAT-file format is independent of the platform structure of the scheduler, the schedule can handle the job regardless of the platform structure of the scheduler. Those of ordinary skill in the art will appreciate that the MAT-file format is an illustrative format and the job can be submitted to the scheduler in any other portable format, such as a binary format or a serial format.

The scheduler then transfers the job in the MAT-file format to one or more remote workers with designation information of the technical computing tasks in the job so that the remote workers perform technical computing on designated tasks and return results to the arbitrary scheduler. The scheduler, in turn, forwards the result to the technical computing client. In the illustrative embodiment, the scheduler refers to a process or program that tracks the progress of and allocates resources for a series of tasks. Although the scheduler generally refers to a job manager or task manager with additional functions, the terms including scheduler, job manager and task manager are used interchangeably in the description of the illustrative embodiment of the present invention.

The illustrative embodiment of the present invention also provides an interface between the host or client and the arbitrary scheduler so that the host or client is able to submit a job and information on the job to the arbitrary scheduler. The information on the job is used for the scheduler to distribute the job to one or more remote workers. Interfaces with the arbitrary scheduler may also be provided to establish communication channels between the arbitrary scheduler and the remote workers so that the arbitrary scheduler is able to distribute the job to the remote workers through the communication channels. The scheduler may send the remote workers information on the designation of one or more tasks in the job so that the remote workers can execute the designated one or more tasks in the job and return the results of executing the one or more tasks to the arbitrary scheduler through the established communication channels between the arbitrary scheduler and the remote workers. The scheduler may subsequently forward the results to the host or client.

FIG. 1 is an exemplary computing device 100 suitable for practicing the illustrative embodiment of the present invention. The computing device 100 may take many forms, including but not limited to a worker, server, network computer, quantum computer, optical computer, bio computer, Internet appliance, mobile device, a pager, a tablet computer, and the like. One of ordinary skill in the art will appreciate that the computing device 100 is intended to be illustrative and not limiting of the present invention.

The computing device 100 may be electronic and include a Central Processing Unit (CPU) 110, memory 120, storage 130, an input control 140, a modem 150, a network interface 160, a display 170, etc. The CPU 110 controls each component of the computing device 100 to provide the distributed computing environment. The memory 120 temporarily stores instructions and data and provides them to the CPU 110 so that the CPU 110 operates the computing device 100 and runs the distributed computing environment. The memory 120 may include a computer system memory or random access memory such as DRAM, SRAM, EDO RAM, etc. The memory 120 may also include other types of memory as well, or combinations thereof. The storage 130, such as a harddrive or CD-ROM, usually contains software tools for applications. The storage 130 includes, in particular, code for the operating system (OS) 131 of the device 100, code for applications 132 running on the operation system including applications for providing the distributed computing environment, such as MATLAB® distributed computing environments, and data 133 for jobs and tasks created in the distributed computing environment and the results of executing the jobs and tasks. The input control 140 may interface with a keyboard 180, a pointing device 190, and other input devices. The computing device 100 may receive through the input control 140 input data necessary for creating jobs and tasks. The computing device 100 may display in the display 170 user interfaces for the users to create the job and tasks. The computing device 100 may also display other user interfaces for the users to interact with the computing device 100 through the display 170, such as a computer monitor, which may include a graphical user interface (GUI). The modem 150 and network interface 160 will be described below with reference to FIG. 2.

Figure 2:
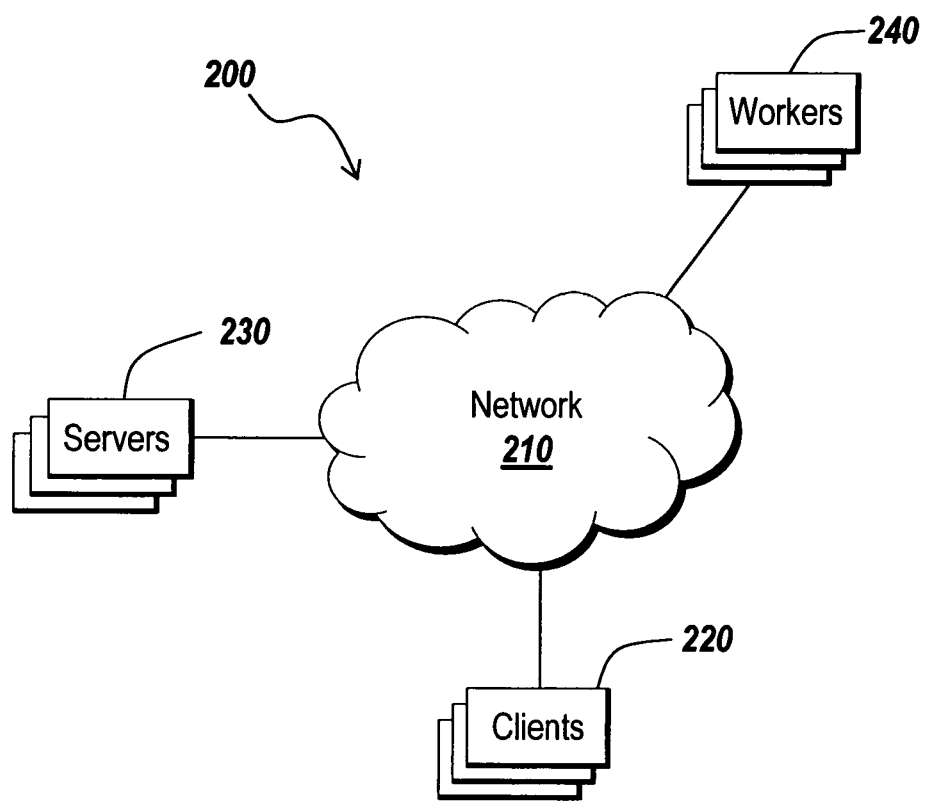
FIG. 2 is a block diagram showing an exemplary network environment for practicing the illustrative embodiment of the present invention.

FIG. 2 is an exemplary network environment 200 suitable for the distributed computing of the illustrative embodiment. The network environment 200 may include servers 230 coupled to clients 220 via a communication network 210. The servers 230 may also be coupled to workers 240 via the communication network 210. The clients 220, servers 230 and workers 240 can be implemented on the computing device 100 depicted in FIG. 1. The network interface 160 and modem 150 of the computing device 100 enable the clients 220, servers 230 and workers 240 to communicate with other clients 220, servers 230 and workers 240 through the communication network 210. The communication network 210 may include Internet, intranet, LAN (Local Area Network), WAN (Wide Area Network), MAN (Metropolitan Area Network), etc. The communication facilities can support the distributed implementations of the present invention. The clients 220, servers 230 and workers 240 will be described below in more detail with reference to FIG. 3.

Figure 3:
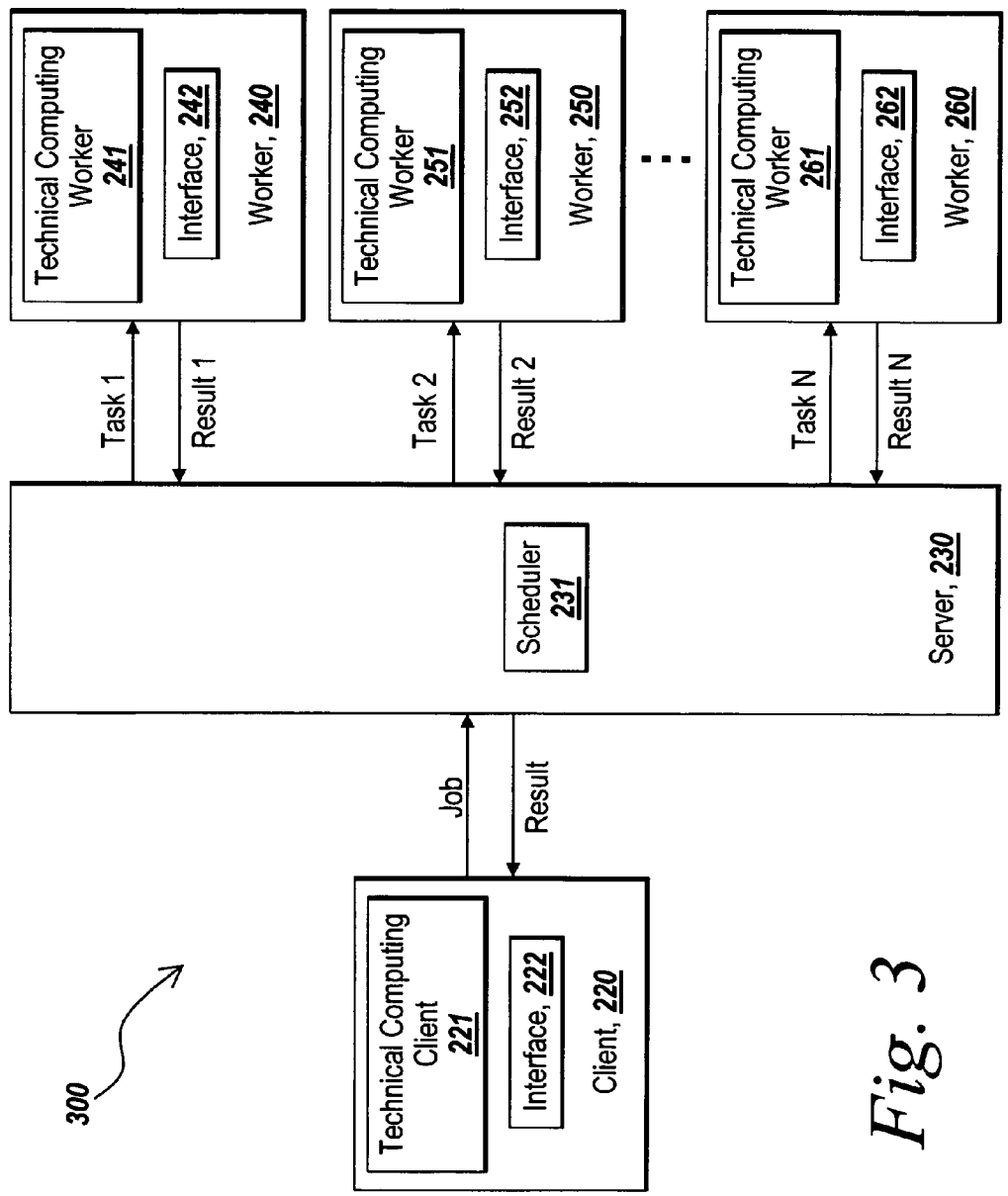
FIG. 3 is a block diagram showing an exemplary distributed computing system for practicing the illustrative embodiment of the present invention.

FIG. 3 shows an illustrative embodiment of an exemplary distributed computing system 300. The distributed computing system 300 includes a technical computing client 221 running on a client 220 in communications over a network communication channel to a server 230 on the network 210. The server 230 includes an arbitrary scheduler 231. The scheduler 231 communicates over a network communication channel on the network 210 to the technical computing workers 241, 251 and 262 on the workers 240, 250 and 260. The distributed computing system 300 allows the technical computing client 221 to use the computing resources that may be available from a technical computing workers 241, 251 and 261 on the workers 240, 250 and 260 to perform technical computing of tasks. This frees up the technical computing client 221 to perform other tasks, or the client 220 to execute other software applications. The technical computing workers 241, 251 and 261 may be available on an as needed basis to the technical computing client 221. When not performing technical computing of tasks from the technical computing client 221, the workers 240, 250 and 260 of the technical computing workers 241, 251 and 261 can be executing other software programs, or the technical computing workers 241, 251 and 261 can perform technical computing of tasks from other technical computing clients. Those of ordinary skill in the art will appreciate that the system 300 is illustrative and the server 230 may serve for multiple clients and the client 220 may request services from multiple servers in other embodiments.

The technical computing client 221 can be a technical computing software application that provides a technical computing and graphical modeling environment and to define mathematical algorithms for simulating models. The technical computing client 221 can be a MATLAB® distributed computing client, which may include all or a portion of the functionality provided by the standalone desktop application of MATLAB®. Additionally, the technical computing client 221 can be any of the software programs available in the MATLAB® product family. Furthermore, the technical computing client 221 can be a custom software program or other software that accesses MATLAB® functionality via an interface, such as an application programming interface, or by other means. One ordinarily skilled in the art will appreciate the various combinations of client types that may access the functionality of the system.

With an application programming interface (API) and/or programming language of the technical computing client 221, functions can be defined representing a technical computing task to be executed by either a technical computing environment local to the client 220, or remote on a worker. The local technical computing environment may be part of the technical computing client 221, or a technical computing worker running on the client 220. The programming language includes mechanisms to define a job to be distributed to a technical computing environment and to communicate the job to the technical computing worker on the worker, or alternatively, on the client 220. For example, the technical computing client 221 may declare a function to generate a random set of ten numbers and further delegate that the technical computing worker running on the worker execute the function. Also, the API and programming language of the MATLAB® distributed computing client includes mechanisms to receive a result from the execution of technical computing of the job from another technical computing environment.

The technical computing workers 241, 251 and 261 can be a technical computing software application that provides a technical computing environment for performing technical computing of tasks, such as those tasks defined or created by the technical computing client 221. The technical computing workers 241, 251 and 261 can be a MATLAB® distributed computing application, module, service, software component, or a session, which includes support for technical computing of functions defined in the programming language of MATLAB®. The technical computing workers 241, 251 and 261 can include all the functionality and software components of the technical computing client 221, or it can just include those software components it may need to perform technical computing of tasks it receives for execution. The technical computing workers 241, 251 and 261 may be configured to and capable of running any of the modules, libraries or software components of the MATLAB® product family. As such, the technical computing workers 241, 251 and 261 may have all or a portion of the software components of MATLAB® installed on the workers 240, 250 and 260, or alternatively, accessible on another system in the network 210. The technical computing workers 241, 251 and 261 are capable of performing technical computing of the task as if the technical computing client 221 was performing the technical computing in its own technical computing environment.

The technical computing client 220 includes an interface 222 that enables the arbitrary scheduler 231 on the server 230 to interface with the technical computing client 221 on the client 220. The interface 222 establishes the communication channel between the technical computing client 221 and the arbitrary scheduler 231 so that the technical computing client 221 is able to submit the job to the arbitrary scheduler through the communication channel. In addition, the technical computing client 220 also receives a result from the execution of the job through the communication channel established by the interface 222 between the technical computing client 221 and the arbitrary scheduler 231. One of ordinary skill in the art will appreciate that the interface 222 may be provided in the technical computing client 221 or in the network interface 160.

The workers 240, 250 and 260 include interfaces 242, 252 and 262 that enable the arbitrary scheduler 231 on the server 230 to interface with the technical computing workers 241, 251 and 262 on the workers 240, 250 and 260, respectively. The interfaces 242, 252 and 262 establish the communication channels between the arbitrary scheduler 231 and the technical computing workers 241, 251 and 261 so that the arbitrary scheduler 231 is able to distribute the job to the technical computing workers 251, 261 and 271 through the communication channels. In addition, the arbitrary scheduler may also receive the result from the execution of the tasks through the communication channels. One of ordinary skill in the art will appreciate that the interfaces 242, 252 and 262 may be provided in the technical computing workers 241 and 251 and 261 or in the network interface 160.

The interfaces establish the communication channel independent of the vender of the arbitrary scheduler and the interface protocol of the arbitrary scheduler. The interfaces are able to establish communication channels with an arbitrary scheduler supplied from various venders and independent of an "interface protocol" or "interface format" of the arbitrary scheduler. The "interface protocol" or "interface format" refers to a set of rules for transmitting data and receiving data from the arbitrary scheduler. The set of rules is capable of defining a data format for transferring data to or receiving data from an arbitrary scheduler and is further capable of defining at least a type of error checking, if any, to be used for data transmissions; a data compression method, if any; how the sending mechanism will indicate that it has finished sending data; how the arbitrary scheduler will indicate that it has received data.

Figure 4:
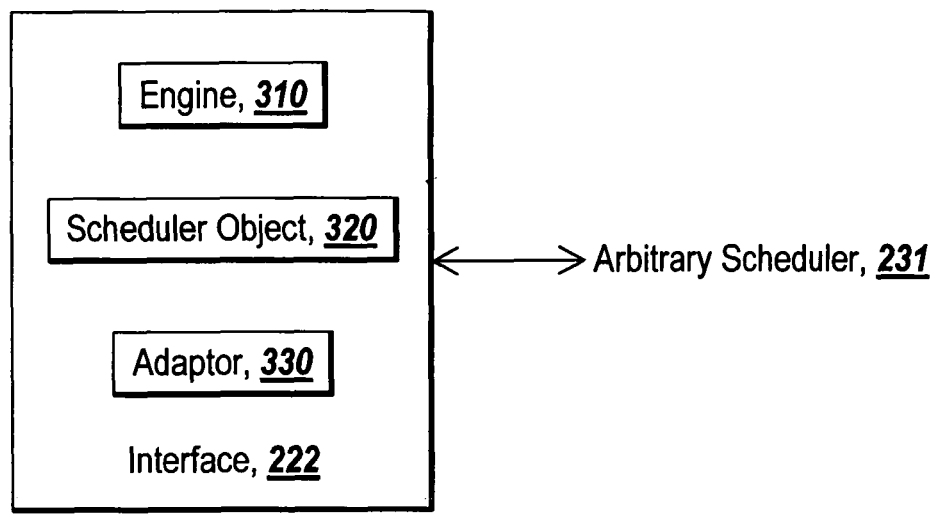
FIG. 4 is a block diagram showing an exemplary interface of the distributed computing system to an arbitrary scheduler.

FIG. 4 is a block diagram showing an exemplary interface 222 in the illustrative embodiment. Those of ordinary skill in the art will appreciate that FIG. 4 depicts an exemplary interface 222 of the technical computing client 221 on the client 220, and the interfaces 242, 252 and 262 of the technical computing workers 241, 251 and 161 on the workers 240, 250 and 260 may be implemented in a similar manner. The interface 222 may include an interface engine 310, a scheduler object 320, and an adaptor 330. In the description below, the interface engine 310, the scheduler object 320, and adaptor 330 are discussed as distinct entities, nonetheless those skilled in the art will appreciate that two or more of them may be implemented as a single entity.

The interface engine 310 is responsible for managing data transfers between the technical computing client 221 and the arbitrary scheduler 231. The interface engine 310 is further responsible for formatting the data into a format understandable by the technical computing client 221 or the arbitrary scheduler 231. The interface engine 310 can interface with a scheduler object 320 to determine a communication protocol defining how the data is transferred between the arbitrary scheduler 231 and the technical computing client 221. The interface engine 310 communicates to the adaptor 330 in order to allow the interface engine 310 to communicate with the arbitrary scheduler 231. The interface 222 is capable of including more than one adaptor 330 for interfacing with different arbitrary schedulers 260. As such, it is possible to have an adaptor 330 for each scheduler 231. The adaptor of the illustrative embodiment is extensible to interface with any of the different arbitrary schedulers 260. The adaptor may provide base properties generic to the arbitrary schedulers 260. The base properties apply to all supported schedulers regardless of the vendor. The adaptor may also provide additional properties specific to each of the different arbitrary schedulers 260. The scheduler-specific properties apply only to a scheduler from a specific vendor. By adding the scheduler-specific properties, the adaptor can be extended to interface with the specific scheduler. The adaptor 330 assists in creating an abstraction of information specific to the arbitrary scheduler 231. The abstracted data is used by the interface 222 to create one or more objects, such as a scheduler object 320, which will be described below in more detail with regard to FIG. 5.

The interface 222 using the interface engine 310 and the adaptor 330 establishes and provides a communication channel between the technical computing client 221 and the arbitrary scheduler 231. Thus, the communication channel operates in a manner independent of an interface type and protocol and the vendor of the arbitrary scheduler thus allowing the technical computing client 221 to interface with and interact with the arbitrary scheduler 231 using a set of functions, methods and controls.

Figure 5:
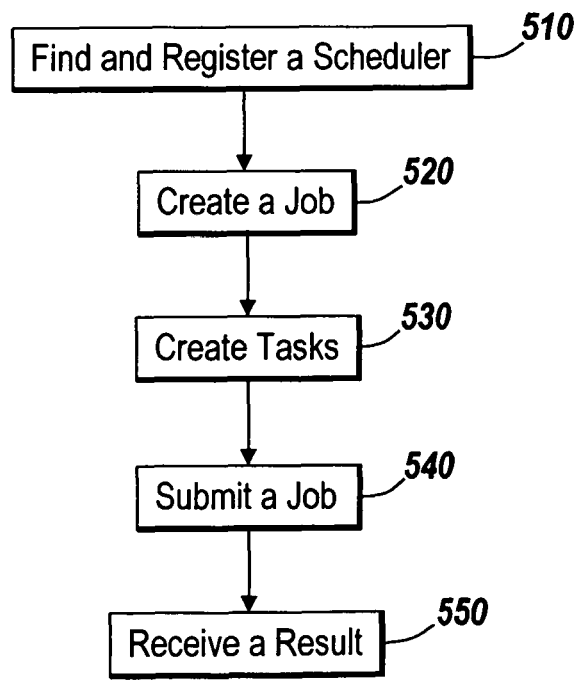
FIG. 5 is a flow chart illustrating an exemplary operation of the client in the distributed computing system depicted in FIG. 3.

FIG. 5 is a flow chart showing an exemplary operation of the client 220 to create a job and submit the job to the scheduler 231. The client 220 finds a scheduler or schedulers on the network 210 and registers the scheduler in its interface 222 (step 510). In the MATLAB® distributed computing environment, users can use the "findresource" command to identify available schedulers and to create an object representing the scheduler in the MATLAB® session of the client 220. Users can examine the properties of each scheduler to identify which one the users want to use. When the users have identified a scheduler, users can isolate it and create a single object on the client 220.

Figure 6:
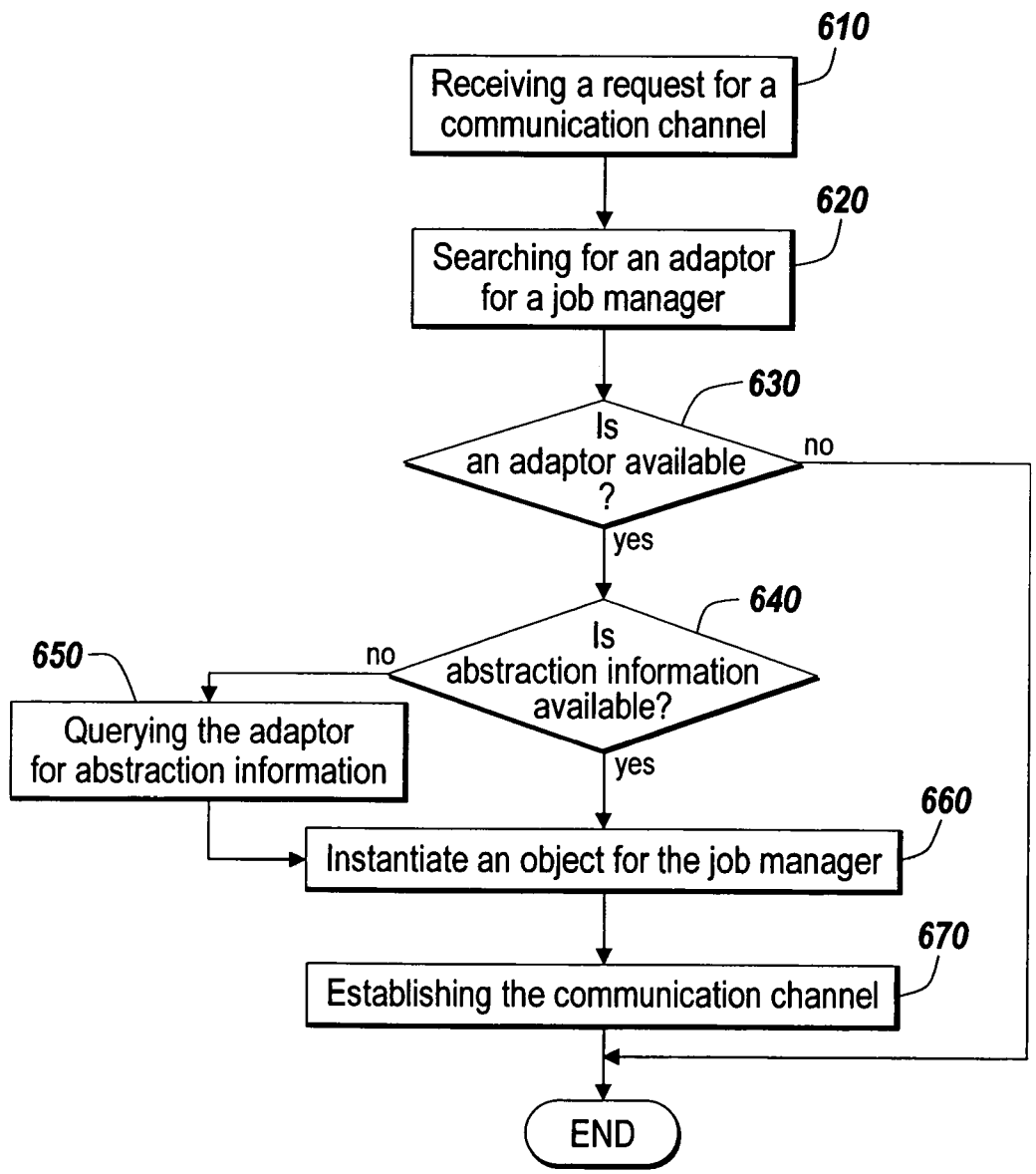
FIG. 6 is a flow chart illustrating an exemplary operation for establishing a communication channel with the arbitrary scheduler.

FIG. 6 illustrates an exemplary operation for creating a scheduler object and using the scheduler object to establish a communication channel with the scheduler. Those of ordinary skill in the art will appreciate that the exemplary operation described relative to the interface 222 may also apply to the operation of the interfaces 242, 252 and 262 of the technical computing workers 241, 251 and 261 on the workers 240, 250 and 260.

The interface 222 may receive a request for a communication channel between the technical computing client 221 and the arbitrary scheduler 231 (step 610). The interface engine 310 searches a directory, or other suitable data structure such as a file or look up table for an available adaptor 330 suitable for the arbitrary scheduler 231 (step 620). The search for available adaptors can be performed once when the request for the communication channel is received, the results of which can be stored in a storage device or in a suitable storage medium. Nevertheless, the interface 222 is adaptable so that each time the request is received a new search is performed for available adaptors in the event that a new adaptor is plugged in. For the purpose of the discussion of the illustrative embodiment of the present invention, information on available adaptors is stored after an initial search. The interface engine 310 can initialize all available adaptors or initialize a selected one or more adaptors suitable for use with the arbitrary scheduler 231. Each initialized adaptor 330 provides some form of an indication, such as a Boolean return value, to the interface engine 310 to indicate completion or failure of initialization. The interface engine 310 upon receipt of all values from the initialized adaptors returns a list of available adaptors that were successfully initiated to the technical computing client 221.

If the adaptor 330 is available for the arbitrary scheduler 231 (step 630) then it is determined if the adaptor 330 has already abstracted information concerning the arbitrary scheduler 231 and if that information is available, for example, is there a file, a class definition, or object that contains the abstracted information (step 640). If the information is not available, the interface engine 310 calls or queries the adaptor 330 to find all schedulers available through the adaptor 330 (step 650). The adaptor 330 returns a list of schedulers available through the adaptor 330. Those skilled in the art will recognize that an adaptor 330 and a scheduler 231 are capable of having a one-to-one relationship so that a selected adaptor must be used to communicate with the arbitrary scheduler 231. Nevertheless, those skilled in the art will further recognize that an adaptor is capable of communicating with multiple schedulers so long as each scheduler 231 has similar methods of communication. If it is determined that no adaptor 330 is available (step 630), then the interface 222 ends the process of establishing the communication channel.

The adaptor 330 is queried for properties, functions, and information of the arbitrary scheduler 231. In turn, the adaptor 330 is able to abstract the requested information and return to the interface engine 310 functions and property information for the arbitrary scheduler 231. The adaptor 330 is also capable of returning a template having the appropriate values in the appropriate fields or returning one or more objects that include the appropriate source and property information for the arbitrary scheduler 231. Further, the adaptor 330 is capable of updating a file or object with data specific to the arbitrary scheduler 231.

To facilitate abstraction of scheduler information by the adaptor 330 that concerns an arbitrary scheduler 231, the interface 222 can provide a read mechanism to assist in creating the scheduler object 320. In one embodiment of the present invention, the read mechanism is a file that contains property information for the arbitrary scheduler 231. Such property information includes, but is not limited to a property name, property type, property constraints, help information and other like information concerning the arbitrary scheduler 231 that the adaptor 330 or the interface engine 310 can read in and create a scheduler object 320. Those skilled in the art will recognize that the read mechanism is not limited to property information for the arbitrary scheduler 231, but can include functions and other information. In one embodiment of the present invention, the read mechanism is structured as a markup language file.

If the adaptor 330 returns one or more objects, the interface engine 310 requests the adaptor 330 to instantiate an object that includes the attributes and methods for the arbitrary scheduler 231 (step 660). The adaptor 330 instantiates such an object and creates a handle to the object that is returned to the adaptor 330 for inclusion in a scheduler object 320 for use by the technical computing client 221 and the interface engine 310 to communicate with the arbitrary scheduler 231. For example, the interface engine 310 upon receipt of the handle from the adaptor 330 can call a constructor that creates the scheduler object 320. The constructor using the provided handle can configure the proportions of the scheduler object 320 to correspond to selected constructor arguments.

The scheduler object 320 provides a high level representation of the communication channel between the technical computing client 221 and an arbitrary scheduler 231. The scheduler abstraction provided by the adaptor 330 provides properties for one or more schedulers 260. The scheduler object 320 further provides access to configuration settings for one or more schedulers 260. The scheduler abstraction provided by the adaptor 330 is further capable of providing a collection of methods, for one or more schedulers 260. One list of these properties and methods is described below.

| Scheduler Object Properties | |
|---|---|
| Property Name | Property Description |
| BusyWorkers | Returns a list of workers that are busy running tasks |
| HostName | Indicate name of the machine where a job queue exists |
| HostAddress | Indicate the IP address of the host machine where a job queue exists |
| FileDependencies | Return a list of user files and directories needed for task execution by the workers |
| IdleWorkers | Returns a list of workers available to run tasks |
| Jobs | Indicate the jobs contained in a scheduler |
| Name | Indicate the name of the scheduler |
| NumberOfBusyWorkers | Indicate number of busy workers |
| NumberOfIdleWorkers | Indicate number of workers available to run tasks |
| State | Indicate the current state of the scheduler |

| Scheduler Object Functions | |
|---|---|
| Method Name | Method Description |
| findJob | Find job objects stored in a job queue |
| Pause | Pause the scheduler queue |
| Resume | Resume processing of the scheduler queue |

The scheduler object 320 may include inputs such as a name given to an associated adaptor 330, a unique scheduler identifier, and other like inputs. The adaptor name input is a term used to describe the adaptor 330 that manages the communication between the arbitrary scheduler 231 and the interface engine 310. The unique scheduler identifier is set to an available identifier by the interface engine 310 if one is not provided. The scheduler object 320 is associated with the arbitrary scheduler 231 uniquely identified by the inputs of the scheduler object 320.

Those skilled in the art will appreciate that within the MATLAB® environment, a MATLAB® M file is configurable such that when the M file is executed the scheduler object 320 is recreated with the configurations it had when the M file was called. In this manner a user is able to capture the state of their configuration settings for later use without having to reconfigure all their settings manually. Furthermore, the execution of a file or other executable means to recreate configuration settings allows a user to readily generate a function that recreates a pre-configured object suitable to their needs. The generated function can then be integrated into an application. Nevertheless, those skilled in the art will appreciate that other executable files are creatable in other software environments to recreate a scheduler object with configuration settings when the executable file is called.

The interface 222 establishes the communication channel between technical computing client 221 and the arbitrary scheduler 231 (step 670). That is, the technical computing client 221 calls the interface engine 310. In turn, the interface engine 310 calls the adaptor 330. The adaptor 330 communicates with the arbitrary scheduler 231, and establishes a connection or communication channel between the technical computing client 221 and the arbitrary scheduler 231. Those skilled in the art will recognize that depending on the arbitrary scheduler 231 and the capabilities of the arbitrary scheduler 231, the interface 222 can offer multiple threads or multiple communication channels between the technical computing client 221 and the arbitrary scheduler 231 or between the technical computing client 221 and multiple arbitrary schedulers.

Referring back to FIG. 5, users can create a job locally on the client 220 (step 520). With an application programming interface (API) and/or programming language of the technical computing client 221, a job can be defined representing a technical computing task to be executed by remote technical workers 241, 251 and 261. The programming language may include mechanisms to define a job to be distributed to a technical computing environment. For example, users may create a job with the following statement in MATLAB® session on the client 221. If this command is executed on the client session, a job object is instantiated from a job class on the client 220.

```
scheduler = findresource('LSF')
j = scheduler.createjob
    Users can see the properties of the job object with the following
statement in MATLAB ®.
    j.get
        UserName:   'jlmartin'
              Tag:   ' '
            State:   'pending'
       CreateTime:   'Tue Nov 23 14:37:51 GMT 2004'
       SubmitTime:   ' '
        StartTime:   ' '
       FinishTime:   ' '
            Tasks:   [0x1 double]
          JobData:   [ ]
SerializedProductList:  [ ]
```

The created job has no callbacks or links to a scheduler, which means that the job is created independently of the scheduler 231 on the network 210. The job's State property is "pending." This means that the job has not been queued for running on the scheduler 231, so users can add tasks to the job. After users have created the job, and while it is still in the pending state, users can create tasks for the job (step 530). Tasks define the functions to be evaluated by the workers during the running of the job. In the illustrative embodiment, a task defines a technical computing command, such as a MATLAB® command, to be executed, and the number of arguments and any input data to the arguments. An exemplary task is provided as follows.

t=j.createTask(@rand, 1, {1})

This task will generate a random number. Users can see the properties of the task object with the following statement in MATLAB®.

```
t.get
                      ID:   0
                Function:   @rand
     NumberOfOutputArguments:   1
         InputArguments:   {[1]}
        OutputArguments:   [ ]
  CaptureCommandWindowOutput:   0
      CommandWindowOutput:   ' '
                   State:   'pending'
            ErrorMessage:   ' '
          ErrorIdentifier:   ' '
                 Timeout:   0
              CreateTime:   'Tue Nov 23 14:38:11 GMT 2004'
               StartTime:   ' '
              FinishTime:   ' '
                  Worker:   ' '
                  Parent:   [1x1 distcomp.localjob]
```

Referring back to FIG. 5, after creating the job and tasks on the client 220, the users then submit the job to the scheduler 231 in a portable format to run the job and have its tasks evaluated in the remote workers 240, 250 and 260 (step 540).

Figure 7:
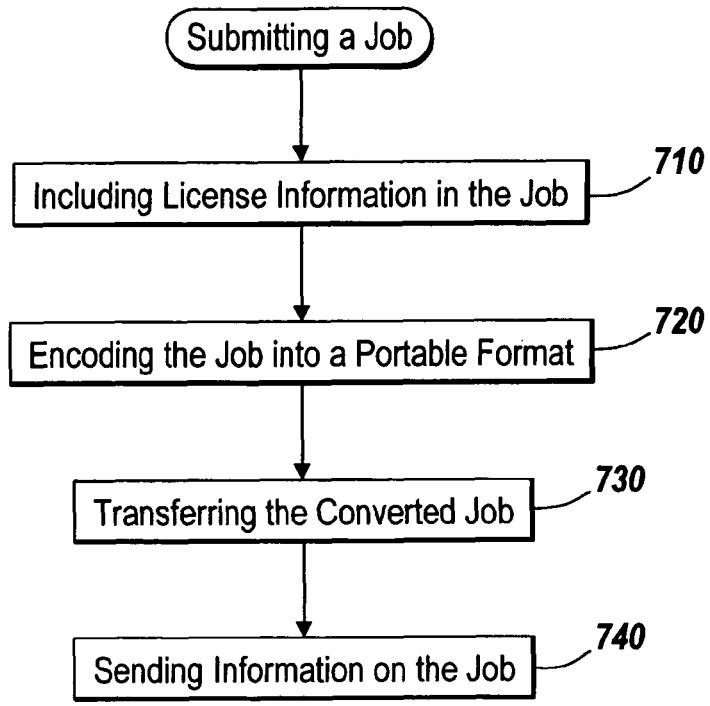
FIG. 7 is a flow chart illustrating an exemplary operation of the client for submitting a job to the arbitrary scheduler.

FIG. 7 is a flow chart showing an exemplary operation of the client 220 to submit the job to the scheduler 230. First, license information of the client 220 is included in the job (step 710). The job generated on the computing client 221 may include one or more function calls provided in different software components or products. The job may be distributed to remote workers for the evaluation of the tasks in the job. When the job is distributed to the workers 270, information on the software components or products for which the computing client 221 is licensed is also distributed within the job.

Figure 8:
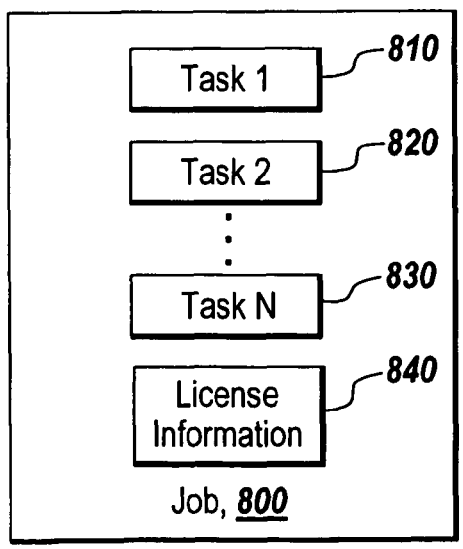
FIG. 8 shows an exemplary job containing license information.

FIG. 8 is an exemplary job object submitted to the scheduler 231 in the illustrative embodiment of the present invention. The job 800 includes a plurality of tasks 810, 820 and 830. The job 800 also includes license information 840 of the client 220. The remote workers receive the job 800 with the license information 840 on the software components or products of the client 220 and dynamically provide licenses for the software components or products based on the information. The workers execute the tasks using the dynamically provided licenses for the software components or products. The utilization of the license information by the technical computing workers will be described below in more detail with reference to FIG. 9.

Referring back to FIG. 7, the job object is then encoded into a portable format, which is independent of the platform structure of the scheduler 231 (step 720). The portable format refers to the format of a program or database that is capable of being moved to various systems. In the illustrative embodiment, the job object is serialized or encoded into a MAT-file format using the "save" function provided in MATLAB®. The "save" function encodes the job object to a continuous byte stream. This involves taking the job object and encoding it into an architecture-independent form, suitable for archival to a file, piping to another application, or, by extension, transmission across a network. The stream may be transient (RAM-based) or persistent (disk-based). A transient stream may be used to prepare the job object for transmission to the scheduler. A persistent stream, such as a file on disk, allows storage of the job object after the current session is finished. In both cases the information in the stream can later be used to construct a data structure containing the same job object as the original. When the workers receive the byte stream, the encoding process is reversed to get a copy of the original job object, which will be described below in more detail with reference to FIG. 9.

A MAT-file stores data in binary form and support MATLAB® array types including multidimensional numeric arrays, character arrays, sparse arrays, cell arrays, structures and objects. The MAT-file includes a header and one or more data elements. Each data element includes a tag and data. The tag specifies the number of bytes in the data element and the type of data in the data element. By using the tags, the MAT-file format provides quick access to individual data elements in the MAT-file. Those of ordinary skill in the art will appreciate that the MAT-file format is an illustrative format and other portable formats can be used in other embodiments.

Referring back to FIG. 7, the job object encoded in the portable format is submitted to the scheduler 231 through the communication channel between the client 220 and the scheduler 231 (step 730). Also, information on the job, such as the properties of the job, can be sent to the scheduler so that the scheduler 231 can distribute the job in the portable format to remote workers using the information (step 740). The properties of the job may include UserName, Tag, State, CreateTime, SubmitTime, StartTime, FinishTime, Tasks, JobData, SerializedProductList, etc., as described above with reference to FIG. 5.

Those of ordinary skill in the art will appreciate that the job 800 can be broken into a plurality of portable format files containing one or more tasks and the plurality of portable format files can be submitted to the scheduler so that the scheduler can distribute the tasks to remote workers. In this case, each of the plurality of portable format files may include the license information 840.

The scheduler 231 is an arbitrary scheduler provided by any of a number of vendors. The arbitrary scheduler 231 may include or be associated with an automatic task distribution mechanism for the automatic distribution of tasks from the technical computing client 221 to the technical computing workers 241, 251 and 261. The automatic task distribution mechanism may allow the technical computing client 221 to delegate the task distribution to the automatic task distribution mechanism. For example, a task can be defined and submitted to the arbitrary scheduler 231 without specifying which technical computing worker is to perform the technical computing of the task. The technical computing client 221 does not need to know the specifics of the technical computing worker. The technical computing client can define a function to submit the task to the arbitrary scheduler 231, and get a result of the task from the arbitrary scheduler 231. As such, the arbitrary scheduler 231 provides a level of indirection between the technical computing client 221 and the technical computing worker.

This eases the distributed programming and integration burden on the technical computing client 221. The technical computing client 221 does not need to have prior knowledge of the availability of the technical computing workers 241, 251 and 261. For multiple task submissions from the technical computing client 221, the arbitrary scheduler 231 can manage and handle the delegations of the tasks to the same technical computing worker 241, or to other technical computing workers, and hold the results of the tasks on behalf of the technical computing client 221 for retrieval after the completion of technical computing of all the distributed tasks.

Figure 9:
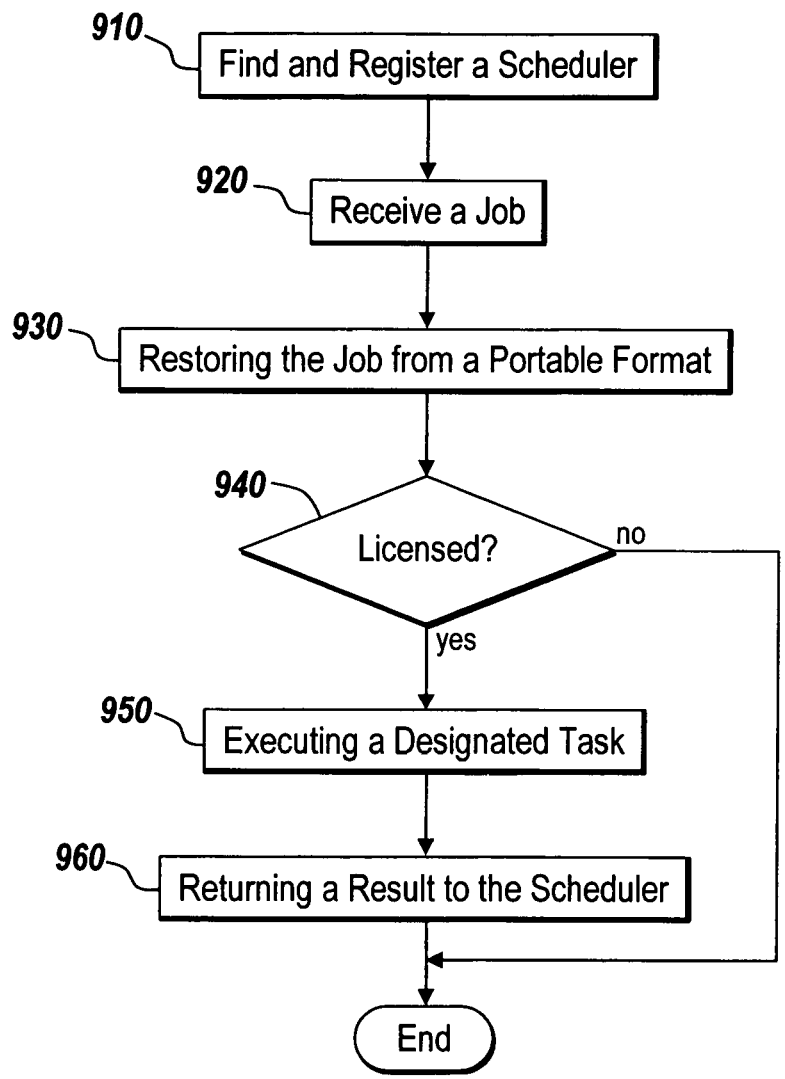
FIG. 9 is a flow chart illustrating an exemplary operation of the worker in the distributed computing system depicted in FIG. 3.

FIG. 9 is a flow chart showing an exemplary operation of the worker 240 for receiving a job and executing a task in the job. The worker 240 establishes a communication channel with the scheduler 231, as described above with reference to FIG. 6 (step 910). After establishing the communication channel with the scheduler 231, the worker 240 receives the job in a portable format from the scheduler 231 (step 920). With the job, the worker 240 may also receive information on the designation of one or more tasks in the job that are to be executed on the worker 240. The worker 240 decodes the job and restores the original job object from the portable format (step 930). For example, if the job is serialized, the worker 240 de-serializes the received job. If the job is received in a MAT-file format, the original job can be restored using the "load" command provided in MATLAB®. The worker 240 extracts the license information included in the job (step 940). If necessary software components and products are licensed, the worker executes the designated task in the job (step 950) and returns the result of executing the task to the scheduler 231 (step 960). The scheduler 231, in turn, returns the results of executing the job to the client 220 (step 550 in FIG. 5). Those of ordinary skill in the art will appreciate that the exemplary operation of the worker 240 may apply to other workers including the workers 250 and 260.

One of skill in the art will appreciate that the distributed computing system described above is illustrative and not limiting the scope of the present invention. Rather, another embodiment of the present invention may implement different computing system, such as serial and parallel technical computing systems, which are described in more detail in pending U.S. patent application Ser. No. 10/896,784 entitled "METHODS AND SYSTEM FOR DISTRIBUTING TECHNICAL COMPUTING TASKS TO TECHNICAL COMPUTING WORKERS," which is incorporated herewith by reference.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:
1. In a client device, a method comprising:
creating a job, where:
the job includes client license information,
the client license information comprises one or more of:
information on software components, or
information on products for which the client device is licensed,
the job includes or more technical computing tasks, the one or more technical computing tasks used in a technical computing environment, the one or more technical computing tasks, respectively, including one or more programs, and the job including at least one instruction for executing the one or more programs;

saving the job in a portable format that is compatible with a plurality of schedulers, the plurality of schedulers having different platform structures;

establishing a communication channel with a scheduler compatible with the portable format, the scheduler being one of the plurality of schedulers; and submitting, through the communication channel, the job in the portable format to the scheduler, the submitted job for distribution in the portable format by the scheduler to one or more workers.

2. The method of claim 1, wherein the portable format is independent of a platform structure of the scheduler.

3. The method of claim 1, wherein the job is saved in a binary format.

4. The method of claim 1, wherein saving the job further comprises:

serializing the job in a storage medium, the medium for storing the job in serial streams of data.

5. The method of claim 1, wherein submitting the job further comprises:

submitting information on the job to the scheduler through the communication channel, the information including at least a program among the one or more programs and data.

6. The method of claim 5, wherein the information on the job enables the scheduler to distribute the job in the portable format to the one or more workers so that the one or more workers are able to execute the one or more technical computing tasks in the job.

7. In a worker device, a method comprising:
establishing a communication channel with a scheduler;
receiving a job, where:
the job includes client license information,
the client license information comprises one or more of:
information on software components, or
information on products for which the worker device is licensed,
the job includes at least one instruction for running one or more programs, wherein
the job is received from the scheduler through the communication channel,
the job is in a portable format, and
the portable format is compatible with a plurality schedulers having different platform structures, the plurality of schedulers including the scheduler;
receiving information on one or more technical computing tasks in the job, the information including at least a program among the one or more programs and data; and
executing, in a technical computing environment, the one or more technical computing tasks in the job based on the information on the one or more technical computing tasks received from the scheduler.

8. The method of claim 7, wherein the portable format is independent of a platform structure of the scheduler.

9. The method of claim 7, where the job further includes the one or more programs.

10. The method of claim 7, wherein the executing further comprises:
deserializing the job from a storage medium.

11. The method of claim 7, further comprising: returning a result of executing the one or more technical computing tasks to the scheduler through the communication channel.

12. A system comprising:
a client for creating a job, where:
the job includes client license information,
the client license information comprises one or more of:
information on software components, or
information on products for which the client is licensed
the job includes one or more technical computing tasks, the one or more technical computing tasks used in a technical computing environment,
the one or more technical computing tasks respectively include one or more programs, and
the job including at least one instruction for executing the one or more programs;
a non-transitory storage medium for saving the job in a portable format that is compatible with a plurality of schedulers having different platform structures; and
a first interface for establishing a first communication channel between the client and a scheduler, where:
the scheduler is one of the plurality of schedulers,
the client submits, through the first communication channel,
the job in the portable format to the scheduler for distribution by the scheduler to one or more workers.

13. The system of claim 12, wherein the first interface comprises:
an adaptor for abstracting information on the scheduler.

14. The system of claim 13, wherein the adaptor provides a first group of properties generic to a plurality of arbitrary schedulers among the plurality of schedulers.

15. The system of claim 14, wherein the adaptor is extended to interface with the scheduler by providing a second group of properties specific to the scheduler.

16. The system of claim 12, further comprising:
a second interface for establishing a second communication channel between a worker among the one or more workers and the scheduler so that the worker receives the job in the portable format from the scheduler through the second communication channel.

17. The system of claim 16, wherein the second interface comprises:
an adaptor for abstracting information on the scheduler.

18. The system of claim 17, wherein the adaptor provides a first group of properties generic to a plurality of arbitrary schedulers among the plurality of schedulers.

19. The system of claim 18, wherein the adaptor is extended to interface with the scheduler by providing a second group of properties specific to the scheduler.

20. The system of claim 16, wherein the client submits information on the job to the scheduler through the first communication channel to enable the scheduler to distribute the job in the portable format to the one or more workers based on the information.

21. The system of claim 16, wherein the worker receives information on the one or more technical computing tasks in the job and executes the one or more technical computing tasks in the job based on the information on the one or more technical computing tasks received from the scheduler, the information including at least a program among the one or more programs and data.

22. The system of claim 12, wherein the portable format is independent of a platform structure of the scheduler.

23. The system of claim 16, wherein the worker returns results of executing the one or more technical computing tasks to the scheduler through the second communication channel.

24. The system of claim 12, wherein the scheduler returns results of the job to the client through the first communication channel.

25. The system of claim 16, further comprising:
a communication network for coupling the client, the scheduler and the one or more workers.

26. A computer program product storing instructions that, when executed on a processor, cause the processor to:
create a job, where:
the job includes client license information,
the client license information comprises one or more of:
information on software components, or
information on products for which a client device is licensed,
the job includes one or more technical computing tasks,
the one or more technical computing tasks used in a technical computing environment,
the one or more technical computing tasks respectively include one or more programs, and
the job including at least one instruction for executing the one or more programs;
save the job in a portable format that is compatible with a plurality of schedulers having different platform structures;
establish a communication channel with a scheduler compatible with the portable format, the scheduler being one of the plurality of schedulers; and
submit, through the communication channel, the job in the portable format to the scheduler for distribution of the job in the portable format by the scheduler to one or more workers.

27. The computer program product of claim 26, wherein the portable format is independent of a platform structure of the scheduler.

28. The computer program product of claim 26, wherein the job is serialized in a storage medium.

29. The computer program product of claim 26, further storing one or more instructions that, when executed on the processor, cause the processor to:
submit information on the job to the scheduler through the communication channel, where the information includes at least a program among the one or more programs and data.

30. The computer program product of claim 29, wherein the information on the job enables the scheduler to distribute the job in the portable format to the one or more workers so that the one or more workers are able to execute the one or more technical computing tasks in the job.

31. The computer program product of claim 26, further storing one or more instructions that, when executed on the processor, cause the processor to:
receive results of the job from the scheduler through the communication channel.

32. In an electronic device, a computer program product storing executable instructions that, when executed on a processor, cause the processor to:
establish a communication channel with a scheduler;
receive a job, where:
the job includes license information,
the license information comprises one or more of:
information on software components, or
information on products for which the electronic device is licensed,
the job includes at least one instruction for running one or more programs,
the job is received in a portable format from the scheduler through the communication channel,
the portable format is compatible with a plurality of schedulers having different platform structures, the plurality of schedulers including the scheduler;
receive information on one or more technical computing tasks in the job, the information including at least a program among the one or more programs and data; and
execute, in a technical computing environment, the one or more technical computing tasks in the job based on the information on the one or more technical computing tasks received from the scheduler.

33. The computer program product of claim 32, wherein the portable format is independent of a platform structure of the scheduler.

34. The computer program product of claim 32, where the job further includes the one or more programs.

35. The computer program product of claim 32, further storing one or more instructions that, when executed on the processor, cause the processor to:
deserialize the job from a storage medium.

36. The computer program product of claim 32, further storing one or more instructions that, when executed on the processor, cause the processor to:
return results of executing the one or more technical computing tasks to the scheduler through the communication channel.

* * * * *

UNITED STATES PATENT AND TRADEMARK OFFICE
CERTIFICATE OF CORRECTION

| | | |
|---|---|---|
| PATENT NO. | : 8,612,980 B2 | Page 1 of 1 |
| APPLICATION NO. | : 11/060971 | |
| DATED | : December 17, 2013 | |
| INVENTOR(S) | : Jocelyn Luke Martin et al. | |

It is certified that error appears in the above-identified patent and that said Letters Patent is hereby corrected as shown below:

In the Claims:

Please correct Claim 1 (Column 14, Line 65) to read as follows:

the job includes one or more technical computing tasks, the

Please correct Claim 12 (Column 16, Line 15) to read as follows:

a storage medium for saving the job in a

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,612,980 B2
APPLICATION NO.   : 11/060971
DATED             : December 17, 2013
INVENTOR(S)       : Martin et al.

Page 1 of 1

It is certified that error appears in the above-identified patent and that said Letters Patent is hereby corrected as shown below:

On the Title Page

Item (63), Related U.S. Application Data should read:
--(63) Continuation-in-part of application No. 10/940,151, filed on Sep. 13, 2004, now Pat. No. 7,502,745, which is a continuation-in-part of of application No. 10/896,784, filed Jul. 21, 2004.--

Signed and Sealed this
Thirteenth Day of August, 2019

Andrei Iancu
*Director of the United States Patent and Trademark Office*